Aug. 4, 1964  G. J. LOVERS  3,142,882
MOLD FOR CONCRETE STRUCTURES
Filed Feb. 5, 1962  5 Sheets-Sheet 1
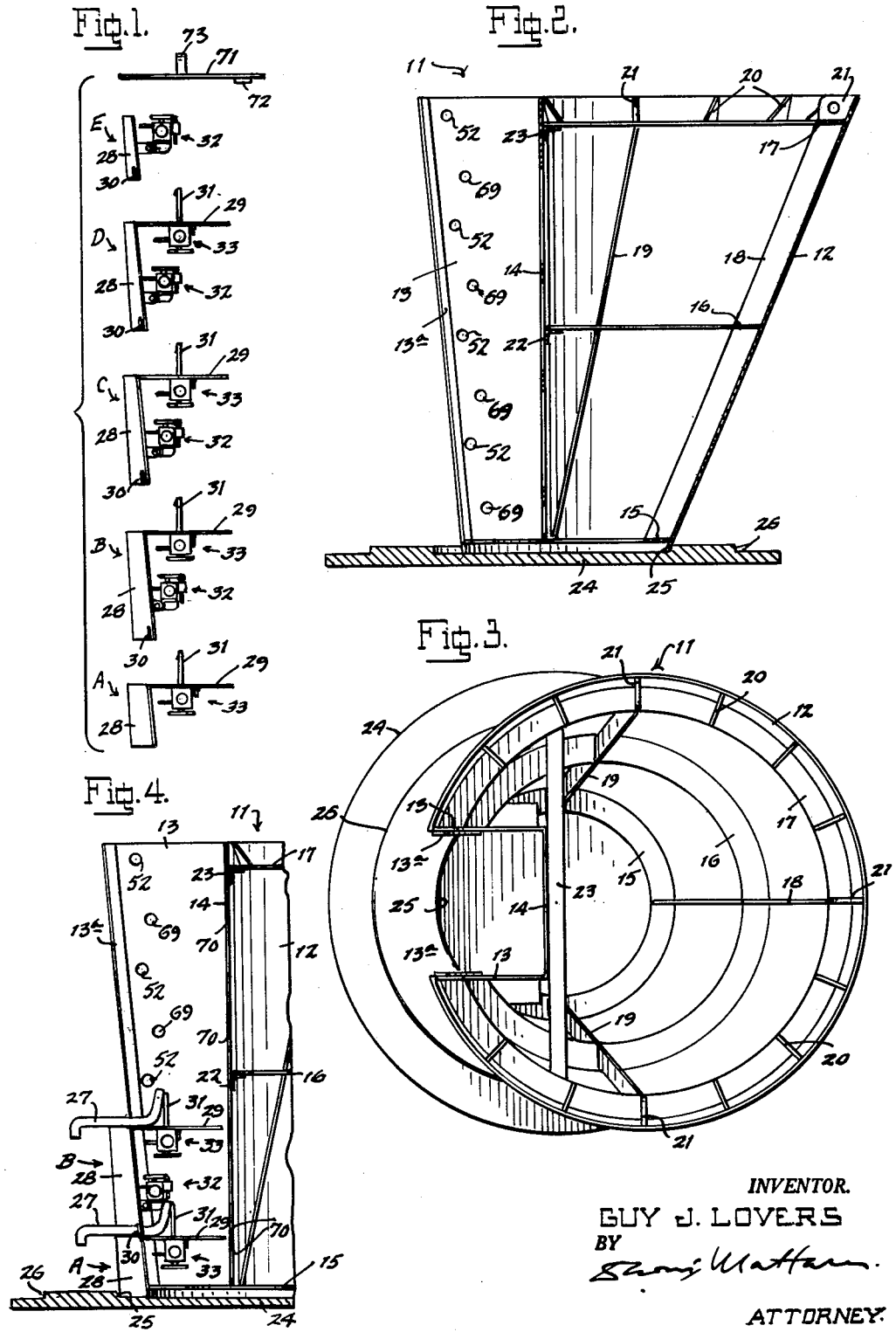
INVENTOR.
GUY J. LOVERS
BY
ATTORNEY.

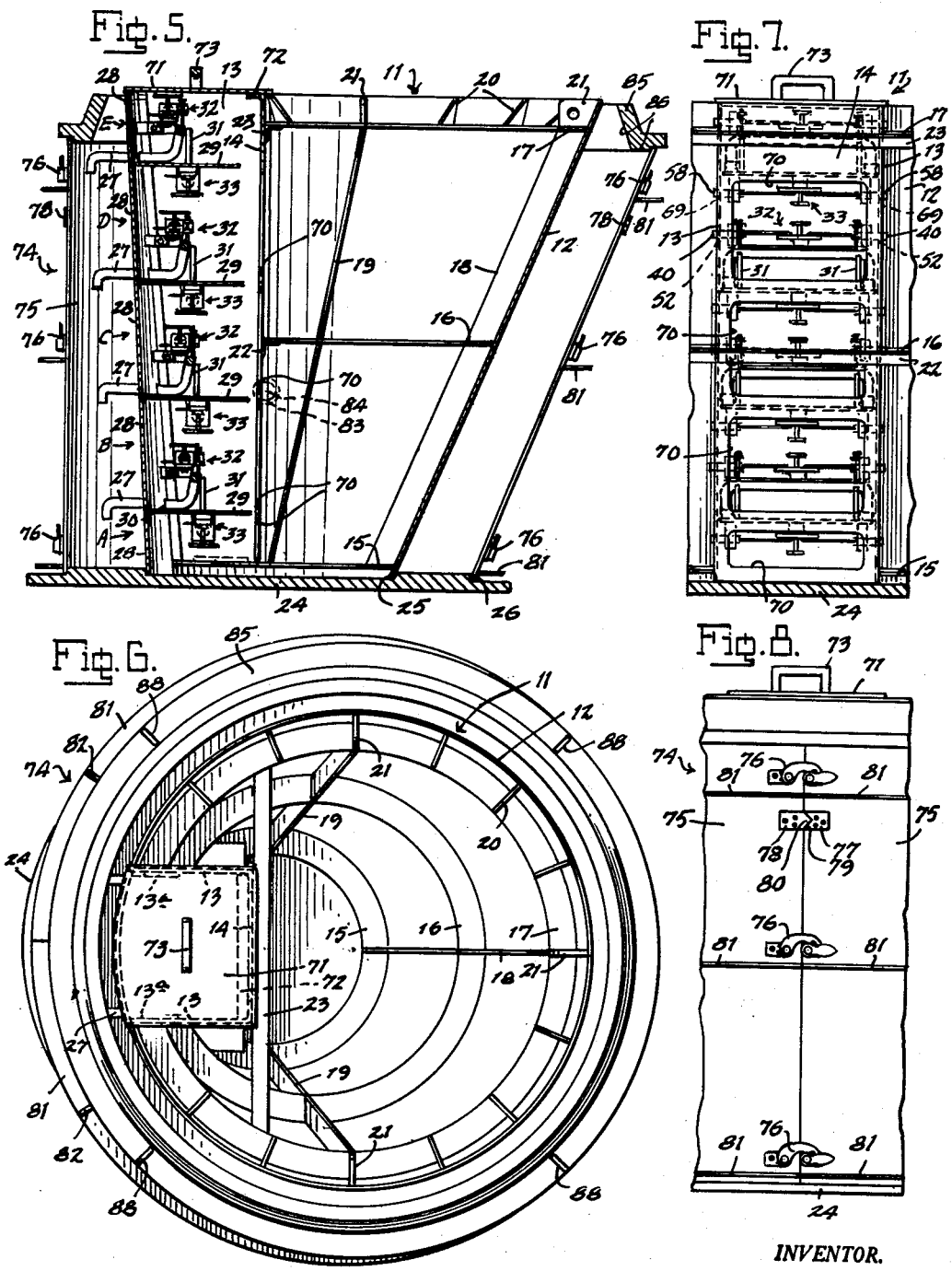

Aug. 4, 1964  G. J. LOVERS  3,142,882
MOLD FOR CONCRETE STRUCTURES
Filed Feb. 5, 1962  5 Sheets-Sheet 3
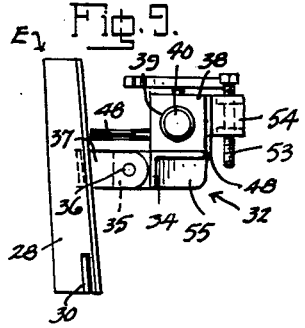
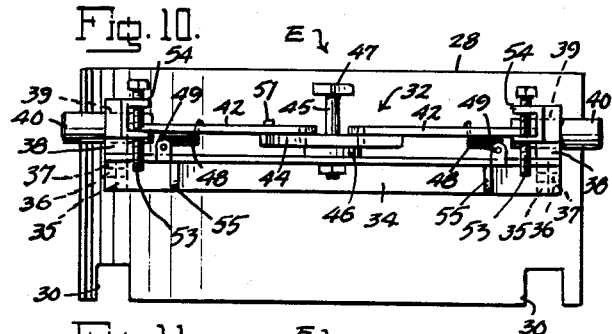
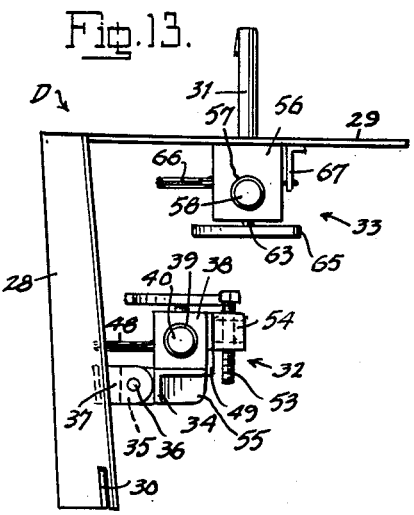
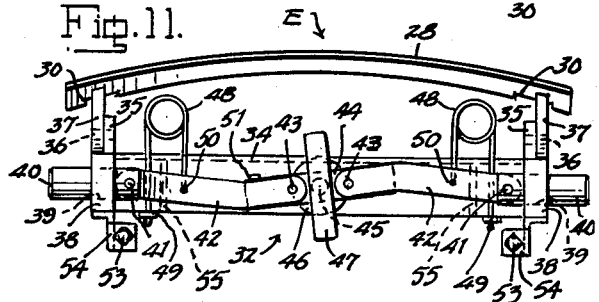
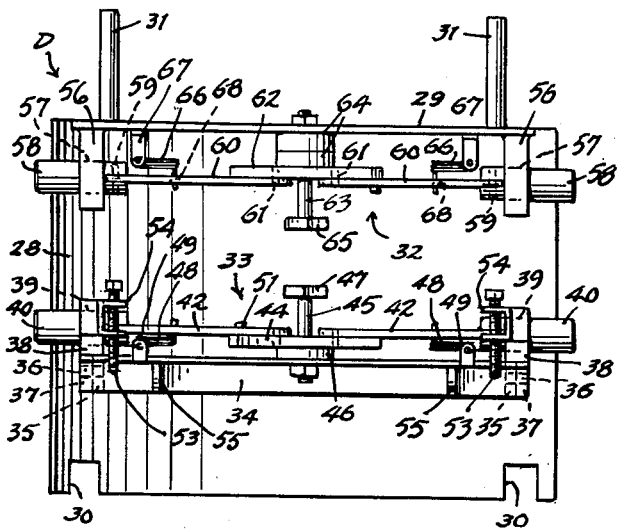
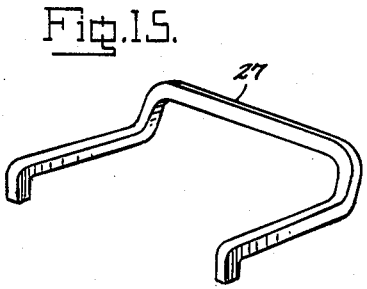
INVENTOR.
GUY J. LOVERS
BY
ATTORNEY.

Aug. 4, 1964   G. J. LOVERS   3,142,882
MOLD FOR CONCRETE STRUCTURES
Filed Feb. 5, 1962   5 Sheets-Sheet 4

INVENTOR.
GUY J. LOVERS
BY
ATTORNEY.

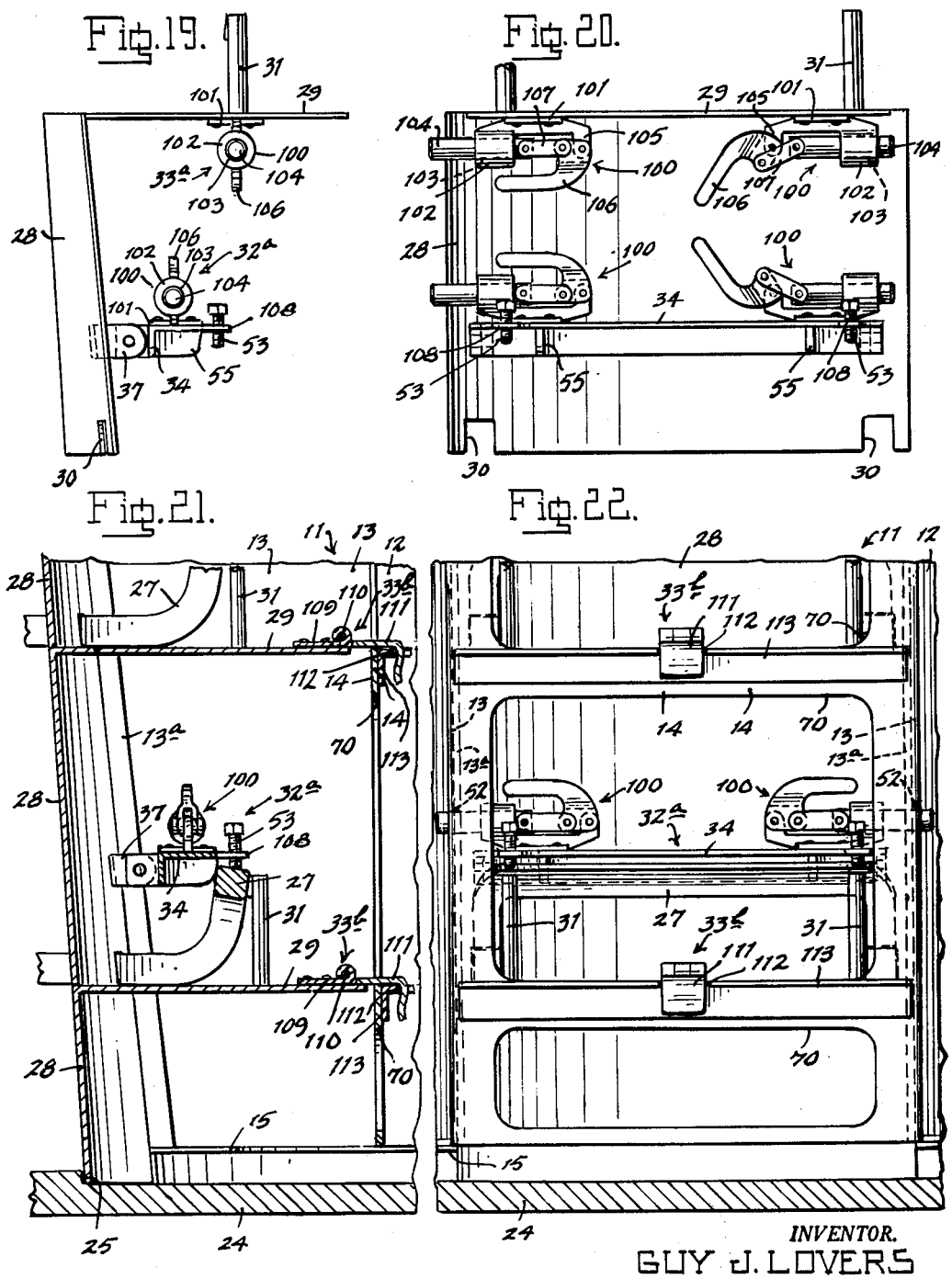

_United States Patent Office_

3,142,882
Patented Aug. 4, 1964

3,142,882
MOLD FOR CONCRETE STRUCTURES
Guy J. Lovers, Milford, Conn., assignor to Metropolitan Welding Fabricators, Incorporated, Milford, Conn., a corporation of Connecticut
Filed Feb. 5, 1962, Ser. No. 171,000
10 Claims. (Cl. 25—124)

The present invention relates to a mold for concrete structures, particularly such structures wherein a ladder is incorporated consisting of a series of step irons having anchoring leg ends imbedded in the concrete structure. While the invention may be advantageously embodied in a mold for producing various types of concrete structures it is especially advantageous in the production of precast manhole sections of the type used in sewer installations and the like.

An object of the invention is to provide a mold by which precast concrete structures may be produced in a rapid and economical manner, and including step support form sections by means of which the step irons may be firmly clamped in place and effectually retained during the pouring and setting of the concrete, particularly where the mold is subjected to vibration to settle and compact the concrete as it is poured. A further object is to provide step support form sections which may be assembled with the associate structure of the mold in such manner as to produce a smooth unbroken wall surface in the area of the concrete structure carrying the step irons.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of a series of step support form sections and a cover member shown in separated relation;

FIG. 2 is a vertical sectional view of the inner mold form and a supporting platen for producing a manhole section in the form of a truncated eccentric cone, the step support form sections being removed;

FIG. 3 is a plan view of the inner mold form and platen as seen in FIG. 2;

FIG. 4 is a fragmentary view, partially in vertical section and partially in side elevation, showing the two lower step support form sections assembled with the inner mold form and the step irons in place thereon;

FIG. 5 is a vertical sectional view showing the complete mold ready for pouring concrete therein;

FIG. 6 is a plan view of the complete mold as seen in FIG. 5;

FIG. 7 is a fragmentary elevational view showing the inner side of the vertical trough portion of the inner mold form as seen in FIG. 5;

FIG. 8 is a fragmentary side elevation of the outer wall of the complete mold showing the connection of the two half-sections of the outer mold form;

FIG. 9 is a side elevation on an enlarged scale of the upper step supporting form section;

FIG. 10 is an elevation showing the inner side of the upper form section as seen in FIG. 9;

FIG. 11 is a top plan view showing the latching means in projected position;

FIG. 12 is a top plan view similar to FIG. 11 and showing the latching means in retracted position;

FIG. 13 is a side elevation of one of the intermediate step support form sections;

FIG. 14 is an elevational view showing the inner side of the form section as seen in FIG. 13;

FIG. 15 is a perspective view of one of the step irons;

FIG. 19 is a side elevation of a step supporting form section having modified latch means;

FIG. 20 is an elevational view showing the inner side of the form section as seen in FIG. 19, with the latching means at the left hand side in projected position and at the right hand side in retracted position;

FIG. 21 is a fragmentary vertical sectional view of a mold according to the invention having still another modified form of the latch means, and FIG. 22 is an elevational view showing the inner side of the structure as seen in FIG. 21.

Figure 16:
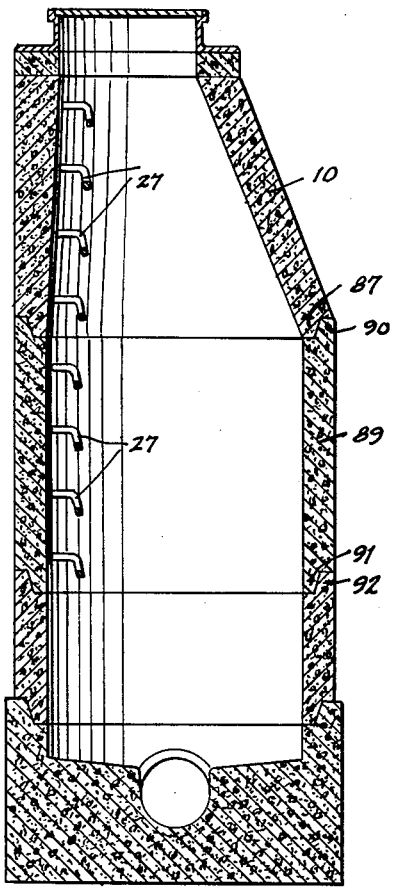
FIG. 16 is a vertical sectional view of a manhole structure including a precast truncated eccentric cone section and a precast cylindrical barrel section as produced by molds in accordance with the invention.

Referring to the drawings and more particularly to FIGS. 1–16, the mold illustrated therein is adapted to precast the upper truncated eccentric cone section 10 of a manhole structure, the same being precast in an inverted position from that illustrated in FIG. 16 with the normally upper smaller end at the bottom. The mold comprises an inner mold form 11 having an outer wall 12 formed from sheet steel and suitably bent to provide an inverted truncated eccentric cone shape wherein one side is inclined upwardly and outwardly at a relatively small angle and the opposite side is inclined upwardly and outwardly at a relatively larger angle. At the side of lesser inclination the upright ends of the wall 12 are spaced apart and are joined as by welding to the outer upright inclined edges of the vertical parallel side walls 13—13 of a vertically disposed trough, the side walls being connected by a vertically disposed transverse wall 14 inwardly offset from the edges of the wall 12 so that the trough opens to one side of the mold form. The trough thus provides a rigid connection between the pair of transversely spaced sections of the wall 12 extending from the sides of the trough.

Interiorly the wall 12 is reinforced by annular stiffening rings 15, 16 and 17 welded in place and extending to the outer sides of the side walls 13—13 of the trough, as clearly seen in FIG. 3. Additional reinforcement is provided by upright ribs 18 and 19 welded in place and by triangular gussets 20 welded to the upper side of the top reinforcing ring 17 and to the inner side of the wall 12. For the purpose of manipulating the inner mold form, that is, raising and lowering it and moving it from place to place as desired, by a suitable chain hoist, apertured cleats 21 are welded at suitable locations to the upper reinforcing rings 17 and to the inner side of the wall 12 to receive hooks upon the ends of the hoisting chains. The trough is rigidly connected to the mold form by angle iron bars 22 and 23 welded at their ends to the reinforcing rings 16 and 17 and welded at their intermediate portions to the transverse wall 14 of the trough.

The lower end of the inner mold form is adapted to be supported upon a circular platen 24 within a circular recess 25, a peripheral shouldered recess 26 being provided in concentric outwardly spaced relation to the recess 25 for receiving the lower edges of the outer mold form, as will presently more fully appear.

A series of step support form sections as seen in FIG. 1 is adapted to be removably secured within the trough of the inner mold form to support step irons 27 and to span the spaced edges of the wall 12. The step irons are of well known type, being of generally U-shape in plan with the transverse bar portion bent out of the plane of the leg portions, the leg portions being bent at their terminal ends to provide anchoring formations. The number of form sections depends upon the number of step irons and in the illustrated example where four step irons are provided five sections A, B, C, D and E are employed, the lower section A and the intermediate sections B, C and D being step supporting sections, the intermediate sections B, C and D and the top section E each having means for clamping a step iron in relation to the next lower section, and all of the sections having means for releasably connecting them to the side walls of the trough.

Each of the sections comprises a transversely curved outer wall 28 which in the assembled position with the trough is circumferentially continuous with the wall 12 and accordingly each of the walls 28 has parallel side edges which engage within the open outer side of the trough against the ends of the wall 12 in abutting relation with the positioning strips 13a—13a secured to the inner sides of the side walls of the trough and inwardly offset in correspondence with the thickness of the walls 28. Because of the truncated eccentric cone shape of the inner mold form each of the walls 28 of the several sections A, B, C, D and E has a different curvature to correspond to the curvature of the part of the form engaged thereby. Each of the sections A, B, C and D is provided at its upper edge with a horizontal shelf plate 29 upon which a step iron is adapted to rest, and each of the walls 28 of the sections B, C, D and E is provided in its lower edge with a pair of notches 30—30 in which the side legs of the step iron supported upon the shelf plate 29 of the next lower section are received. The shelf plate 29 of each of the sections A, B, C and D is provided with a pair of upright step iron positioning posts 31 secured as by staking and welding in place.

Each of the sections B, C, D and E is provided with step iron clamping and latching means, indicated generally as 32, hingedly connected to the wall 28 and including latching means adapted to be releasably connected to the side walls 13—13 of the trough, and each of the sections A, B, C and D is provided with latching means, indicated generally as 33, secured to the under side of the shelf plate 29 for releasably securing these sections to the side walls of the trough, as will presently more fully appear. Inasmuch as the clamping and latching means 32 for the several sections B, C, D and E are identical, and inasmuch as the several latching means 33 of the sections A, B, C and D are identical, a detailed description of such means as embodied in the top section E and in the intermediate section D will suffice for the remaining sections.

The clamping and latching means 32 is illustrated in detail in FIGS. 9–12 in connection with the top section E and comprises an angle iron bar 34 hingedly mounted upon the curved outer wall 28 by means of lugs 35 secured as by welding adjacent each end and pivotally connected by pins 36 to brackets 37 secured as by welding to the inner side of the wall 28. At each end of the upper side of the bar 34 there is secured as by welding a block member 38 having a horizontal cylindrical passage 39 in which there is slidably engaged a cylindrical bolt 40 pivotally connected by a pin 41 to one end of a toggle link 42, the other end of which is connected by a pin 43 to one side of an arm 44 rigidly connected to a handle shaft 45 rotatably mounted centrally of the angle iron bar 34. A spacer washer 46 is interposed between the arm 44 and the bar 34 and a handle 47 is rigidly secured to the upper end of the shaft 45.

A pair of coil springs 48—48 each has one leg connected to an apertured lug 49 welded to the bar 34 and the other leg engaged in an aperture 50 in one of the toggle links 42, and each spring exerts pressure to retract one of the bolts. The toggle links 42 are angular in plan and in the projected position as seen in FIGS. 10 and 11 a lug 51 provided upon one end of the arm 44 engages one side of one of the toggle links 42 and limits the projected position to a point slightly beyond the dead center point of the pin connection 43, the springs 48 exerting inward pressure upon the toggle links to releasably retain the bolts in the projected position as seen in FIGS. 10 and 11. By turning the handle 47 in clockwise direction from the position as seen in FIG. 11 to a point to bring the pin connection 43 to the other side of the dead center point the springs 48 exert inward pressure upon the toggle links to move the bolts to their retracted position as seen in FIG. 12, which position is limited through abutment of the toggle links 42 with the centrally disposed handle shaft 45. Thus the bolts may be retracted by a slight turning movement of the handle 47 whereupon the pressure of the springs completes the retracting movement, and they may be projected by turning the handle 47 in counter-clockwise direction from the position as seen in FIG. 12 to compress the springs and carry the pivot pins 43 over the dead center points where the springs then releasably maintain the projected position. In the projected position the bolts engage keeper holes 52 provided in the side walls 13 of the trough.

A pair of step iron positioning screws 53—53 is provided in brackets 54—54 secured to the blocks 38—38 and a pair of step iron positioning lugs 55 is secured to the underside of the angle iron bar 34.

The latching means 33 as seen in FIGS. 13 and 14 is substantially similar in construction and operation to the latching means 32 except that instead of being hingedly mounted upon the inner side of the wall 28 it is fixedly mounted upon the under side of the shelf supporting plate 29. It comprises block members 56—56 adjacent the side edges of the plate 29 having cylindrical passages 57—57 engaged by cylindrical bolts 58—58 which are pivotally connected by pins 59—59 to the outer ends of toggle links 60—60, the inner ends of which are connected by pins 61—61 to an arm 62 rigidly secured to a handle shaft 63 pivotally mounted centrally between the side edges of the plate 29. Spacer washers 64 are interposed between the arm 62 and the plate 29 and a handle 65 is provided upon the lower end of the shaft 63. Coil springs 66—66 each has one leg connected to a bracket 67 secured to the under side of the plates 29 and the other leg engaged in a hole 68 of one of the toggle links 60. In the projected position of the bolts 58 they engage keeper holes 69 in the side walls 13 of the trough.

In the operation of assembling the step irons 27 with the inner mold form one workman is positioned at the outer side of the mold form opposite the trough and another workman stands within the mold form where he has access to the interior of the trough through a series of openings 70 in the transverse wall 14. The workman at the outer side first places the lower step supporting section A in relation to the lower end of the trough and the workman at the inner side actuates the latching means 33 to project the bolts 58 into engagement with the lowermost keeper holes 69 to thus rigidly connect the section A. Thereupon the workman at the outer side places a step iron in position upon the shelf plate 29 of the section A and positions the section B within the trough, the workman at the inner side at the same time swinging the clamping and latching means 32 upwardly to clear the step iron and actuating the latching means 33 to project its bolts 58 into engagement with the keeper holes 69. With the section B rigidly held in place the workman at the inner side swings the clamping and latching means 32 downwardly to engage the positioning screws 53 with the upper side of the step iron and the lugs 55 with the inner side thus forcing its outer side firmly against the positioning posts 31, whereupon he turns the handle 45 to project the bolts 40 into engagement with the keeper holes 52, so that the position of the step iron is thus rigidly fixed. Thereupon a second step iron is placed upon the shelf plate 29 of the section B and the operation is repeated until the several step irons are in place and the top step iron is clamped by the clamping and latching means 32 of the upper section E. As the upper section E does not have a shelf plate 29 the handle of the clamping and latching means 32 may be operated through the upper open end of the trough, whereupon a cover member 71 is fitted in place for the purpose of preventing concrete from entering the trough during the pouring operation. The cover is provided at its under side with a positioning cleat 72 and at its upper side with a manipulating handle 73.

With all of the step plates in position as seen in FIG. 5 the outer mold form 74 is placed in position. This mold form comprises a pair of half-sections 75—75 which together form a truncated eccentric cone outwardly spaced from the inner mold form 11, the lower edges of the half-sections being seated upon the platen 24 within the peripheral shouldered recess 26 where the two halves are secured together by a series of swing latches 76 as seen in FIG. 8. These are preferably of suitable cam type to draw the opposed upright edges of the half-sections into tight abutting relation with each other. The half-sections are also provided at each side of their opposed upright edges with positioning lugs 77 and 78 respectively having a V-shaped recess 79 and a V-shaped projection 80 which through interengagement align the half-sections both vertically and laterally. The half-sections are preferably provided exteriorly with reinforcing semi-circular bands 81 and at suitable points along the top band there are provided apertured cleats 82 to enable the half-sections to be moved into and out of place by suitable chain hoist means connected thereto.

Preferably the half-sections 75 are provided with diametrically opposed holes 83 in which suitable core pieces 84 may be inserted for the purpose of casting diametrically opposed recesses in the concrete manhole section to enable its convenient handling by suitable hoisting means engaged in such recesses.

A flanged mold ring 85 is seated upon the upper edge of the outer mold form 74 in concentric spaced relation to the upper end of the inner mold form 11 and is provided with an angular cross-section annular inner surface 86 shaped to mold the annular tapered positioning flange 87 upon the end of the manhole section 10, this flange in the completed precast section as seen in FIG. 16 being at the lower end of the section. Apertured cleats 88 are provided at suitable locations upon the ring 85 for manipulating it by suitable chain hoist means.

With the outer form and the mold ring in place the concrete is poured in the space between the forms and the projecting legs of the step irons are imbedded in the concrete wall thus formed. Prior to setting of the concrete the mold may be subject to vibration as is customary in the molding of such concrete parts, and it is important to note in this respect that the rigid support of the step irons prevents any possibility of their displacement during such vibration.

Upon completion of the casting and setting of the poured concrete the mold is removed by first lifting and removing the mold ring 85, and then unlatching the latches 76 of the outer mold form and moving the half-sections laterally away from the outer surface of the cast section, the outward movement of the half-sections at the same time removing the core pieces 84 from the cast section. Thereupon a workman positions himself within the inner mold form 11 and by reaching through the openings 70 retracts the bolts of the clamping and latching means 32 and the clamping means 33, thus freeing the step iron supporting sections from the trough of the inner mold form. A chain hoist is then connected to the inner mold form and it is removed vertically from the cast section leaving the step iron supporting sections in place through the normal light adherence of the walls 28 with the inner surface of the cast section. With the inner mold form removed a workman positioned within the cast section then removes the step supporting sections in reverse order to the order of their installation, i.e., the top section E is removed first by first swinging the clamping and latching means free of the step iron. Thereupon the sections D, C and B are successively removed in similar manner, and finally the lower section A is removed. The cast section at this point rests upon the platen 24 and may be conveniently removed therefrom by hoist means engaged with the recesses formed in its side by the core pieces 84.

Figure 17:
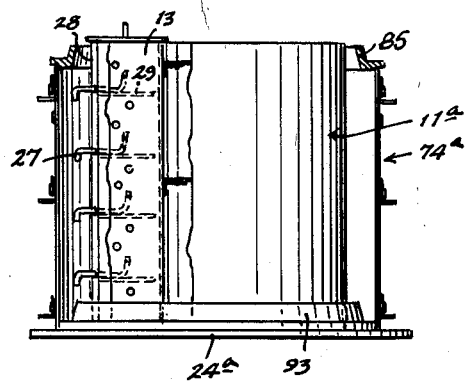
FIG. 17 is a view partially in vertical section and partially broken away of a modified mold for producing the precast cylindrical barrel section as seen in FIG. 16.

In FIG. 17 there is illustrated a modified form of the mold according to the invention for casting the cylindrical barrel section 89 shown in FIG. 16 which is provided at its upper end with a tapered positioning flange 90 for engagement with the flange 87 of the section 10 and at its lower end with a tapered positioning flange 91 for interengagement with a flange 92 of another section of the manhole structure, as will be understood. The barrel section is cast in an inverted position from that shown in FIG. 16 and the mold is substantially identical to the mold of the first embodiment, except that both the inner mold form 11a and the outer mold form 74a are cylindrical. Additionally the platen 24a is provided with a mold ring formation 93 of angular cross-section to form the tapered flange 90 of the barrel section 89. For the purpose of facilitating the vertical withdrawal of the inner mold form from the cast section, it may in accordance with conventional molding procedure be provided with means for collapsing the form inwardly, or it may be slightly tapered downwardly.

Figure 18:
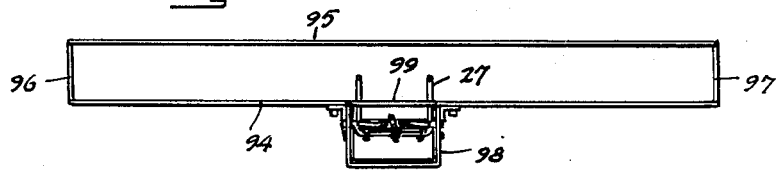
FIG. 18 is a plan view of a modification of the invention for producing a straight wall section with ladder step irons incorporated therein.

In FIG. 18 there is shown a modification in which the mold of the invention is adapted for the casting of a straight wall section. The mold comprises opposed longitudinal upright walls 94 and 95 and end walls 96 and 97, the wall 94 comprising a pair of transversely spaced wall sections rigidly connected by an interposed vertical trough 98, and the upright walls 99 of the step iron supporting sections engaged within the trough being flat and disposed in flush relation with the wall. The step supporting sections are otherwise like those of the first embodiment in structure and operation.

In FIGS. 19 and 20 there is illustrated a modified form of step support in which the clamping and latching means 32a and latching means 33a are provided with latching units 100 of well-known form in which the bolts are actuated by individual actuating handles as distinguished from the central actuating handle common to a pair of bolts as employed in the clamping and latching means 32 and the latching means 33 of the first embodiment. These units each comprise a frame having a base 101 which is riveted to the supporting structure, a bearing portion 102 having a cylindrical passage 103 in which the bolt 104 is slideable, a lug 105 upon which the actuating lever handle 106 is pivoted, and links 107 connecting the inner end of the bolt to the handle. The step iron positioning screws 53 are mounted in lugs 108 welded to the edge of the angle iron bar 34, as distinguished from the first embodiment where these screws are mounted in brackets 54. In FIG. 20 the left hand latches are shown projected and the right hand latches are shown retracted.

In FIGS. 21 and 22 there is shown another modification in which latching means 33b is provided upon the under side of each of the shelf plates 29 in place of the latching means 33 as in the first embodiment or the latching means 33a of the embodiment shown in FIGS. 19 and 20. The latching means 33b comprises a strap hinge consisting of a strap part 109 riveted adjacent the edge of the shelf plate 29 and connected by a hinge pin 110 to a hook shaped strap part 111 which is adapted to be swung into hooked engagement with the keeper notch 112 of an angle iron keeper bar 113 secured as by welding to the transverse wall 14 of the trough, the upper side of the keeper bar being flush with the lower edge of the access opening 70 and this lower edge being substantially flush with the upper surface of the shelf plate 29. In order to disconnect the step supporting sections the hook part 111 is swung out of engagement with the keeper bar, whereupon the inner mold form is free to be removed in a vertical direction in similar manner to the operation of the first embodiment. In FIGS. 21 and 22 clamping and latching means 32a is provided similar to that provided in the modification of FIGS. 19 and 20. It will be understood however that the clamping and latching means may if desired be the same as the clamping and latching means 32 of the first embodiment.

The term "step iron" as employed herein is a generic term employed in the industry and comprehends step units made of iron as well as of other materials, for example aluminum.

What is claimed is:

1. A mold for casting an upright concrete wall structure having upright series of ladder forming step irons or the like partially imbedded therein and partially projected therefrom, said mold comprising a pair of spaced mold forms providing a casting space between them, one of said forms comprising a rigidly connected pair of transversely spaced upright wall sections having transversely spaced opposed parallel upright side edges defining an upright space opening to said casting space, a pair of transversely opposed parallel side walls rigidly connected to said wall sections extending from said side edges thereof away from said casting space, a plurality of superimposed mold form sections engaged in said upright space and engageable therein from the casting space side thereof, each said mold form section comprising an upright wall transversely spanning said upright space and having parallel side edges engaged with said parallel side edges of said upright wall sections, shelf means carried by at least some of said mold form sections extending away from said casting space for supporting a step iron or the like partially projected within said casting space, clamping means carried by said mold form sections for clamping said step irons or the like upon said shelf means, and latching means for releasably connecting said mold form sections to said opposed side walls.

2. The invention as defined in claim 1, further characterized in that said upright wall of each said mold form section next above said shelf means has notch means in its lower edge through which said step iron or the like supported upon said shelf means projects within said casting space.

3. A mold for casting an upright concrete wall structure having an upright series of ladder forming step irons or the like partially imbedded therein and partially projected therefrom, said mold comprising a pair of spaced mold forms providing a casting space between them, one of said forms comprising a pair of transversely spaced upright wall sections having transversely spaced opposed parallel upright side edges, an upright trough comprising an upright transverse wall having access openings therein and a pair of transversely opposed parallel side walls rigidly connected to said wall sections and extending from said upright side edges thereof away from said casting space and defining an upright space opening to said casting space, a plurality of superimposed mold form sections engaged in said upright space and engageable therein from the casting space thereof, each said mold form section comprising an upright wall transversely spanning said upright space and having parallel side edges engaged with said parallel side edges of said upright wall sections, shelf means carried by at least some of said mold form sections extending away from said casting space for supporting a step iron or the like partially projected within said casting space, clamping means carried by said mold form sections for clamping said step irons or the like upon said shelf means, and latching means for releasably connecting said mold form sections to said side wall of said trough.

4. A mold for casting an upright concrete wall structure having an upright series of ladder forming step irons or the like partially imbedded therein and partially projected therefrom, said mold comprising a pair of spaced mold forms providing a casting space between them, one of said forms comprising a pair of transversely spaced upright wall sections having transversely spaced opposed parallel upright side edges, an upright trough comprising an upright tranverse wall having access openings therein and a pair of transversely opposed parallel side walls rigidly connected to said wall sections and extending from said upright side edges thereof away from said casting space and defining an upright space opening to said casting space, a plurality of superimposed mold form sections engaged in said upright space and engageable therein from the casting spaced side thereof, said mold form sections comprising a bottom section, a plurality of intermediate sections, and a top section, each said section comprising an upright wall tranversely spanning said upright space and having parallel side edges engaged with said parallel side edges of said first upright wall, shelf means carried by each of said bottom and intermediate sections extending away from said casting space for supporting a step iron or the like partially projected within said casting space, clamping means carried by said intermediate and top sections for clamping said step irons or the like upon said shelf means of said bottom and intermediate sections comprising a clamping member hingedly mounted upon said upright wall of each of said intermediate and top sections, latching means carried by said clamping member for releasable connection with said side walls of said trough, and latching means carried by said shelf means of said bottom and intermediate sections for releasable connection with said trough, said first mentioned latching means comprising a pair of horizontal axially aligned bolts, and actuating means for projecting and retracting said bolts, and said side walls of said trough having keeper holes for receiving said bolts in their projected positions.

5. The invention as defined in claim 4, further characterized in that said actuating means is common to said pair of bolts.

6. The invention as defined in claim 4, further characterized in that said actuating means is individual to each of said pair of bolts.

7. The invention as defined in claim 4, further characterized in that said last mentioned latching means comprises a pair of horizontal axially aligned bolts, and actuating means for projecting and retracting said bolts, and wherein said side walls of said trough have keeper holes for receiving said bolts in their projected positions.

8. The invention as defined in claim 7, further characterized in that said actuating means is common to said pair of bolts.

9. The invention as defined in claim 7, further characterized in that said actuating means is individual to each of said pair of bolts.

10. The invention as defined in claim 4, further characterized in that said last mentioned latching means comprises a hook member hinged to said shelf means, and movable to latching position through an opening of said transverse wall, and keeper means carried by said transverse wall engageable by said hook member in its latching position.

References Cited in the file of this patent

UNITED STATES PATENTS

| | | |
|---|---|---|
| 992,782 | Lambie | May 23, 1911 |
| 1,329,730 | Tracy | Feb. 3, 1920 |